United States Patent [19]

Pearce

[11] Patent Number: 4,674,223
[45] Date of Patent: Jun. 23, 1987

[54] FISHING LURE

[75] Inventor: Frank G. Pearce, Garland, Tex.

[73] Assignee: Thornton-Denena Industries, Garland, Tex.

[21] Appl. No.: 765,384

[22] Filed: Aug. 13, 1985

Related U.S. Application Data

[63] Continuation-in-part of Ser. No. 595,392, Mar. 30, 1984, abandoned.

[51] Int. Cl.⁴ ............................................. A01K 85/06
[52] U.S. Cl. ..................................... 43/26.2; 43/42.3; 446/158; 446/353
[58] Field of Search ................ 43/26.2, 26.1, 42, 42.3; 446/158, 333, 353, 354

[56] References Cited

U.S. PATENT DOCUMENTS

| | | | |
|---|---|---|---|
| 726,021 | 4/1903 | Bryan | 43/26.2 |
| 891,037 | 6/1908 | Caldwell | 43/26.2 |
| 1,758,160 | 5/1930 | Lee | 43/26.2 |
| 2,229,175 | 1/1941 | Johnson | 43/26.2 |
| 2,284,183 | 5/1942 | Wade | 43/26.2 |
| 2,555,802 | 6/1951 | Martin | 43/26.2 |
| 2,724,205 | 11/1955 | Howard | 43/26.2 |
| 2,754,609 | 7/1956 | Schultz | 43/17 |
| 2,813,365 | 11/1977 | Cross | 43/26.2 |
| 2,932,112 | 4/1960 | Graves, Jr. | 43/42.02 |
| 3,153,871 | 10/1964 | Semba | 446/353 |
| 3,457,667 | 7/1969 | Tripp | 43/26.2 |
| 4,068,401 | 1/1978 | Saitoh | 446/158 |

Primary Examiner—Gene P. Crosby
Attorney, Agent, or Firm—Charles S. Cotropia

[57] ABSTRACT

A fishing lure (20) has a body structure (22) with hooks (24) attached thereto. A windup mechanism (80) includes a spool (58) and a spring (90) operating in conjunction with the spool to store energy therein. Propulsion structures, such as legs or fins (26, 28, 224, 226), extend externally from the body for movement upon operation of the windup mechanism. A shaft (60) extends through the spool and windup mechanism and is rotatively secured to the body. A drive train structure (120) is driven by the spring to provide an oscillating movement to the legs or fins.

23 Claims, 14 Drawing Figures

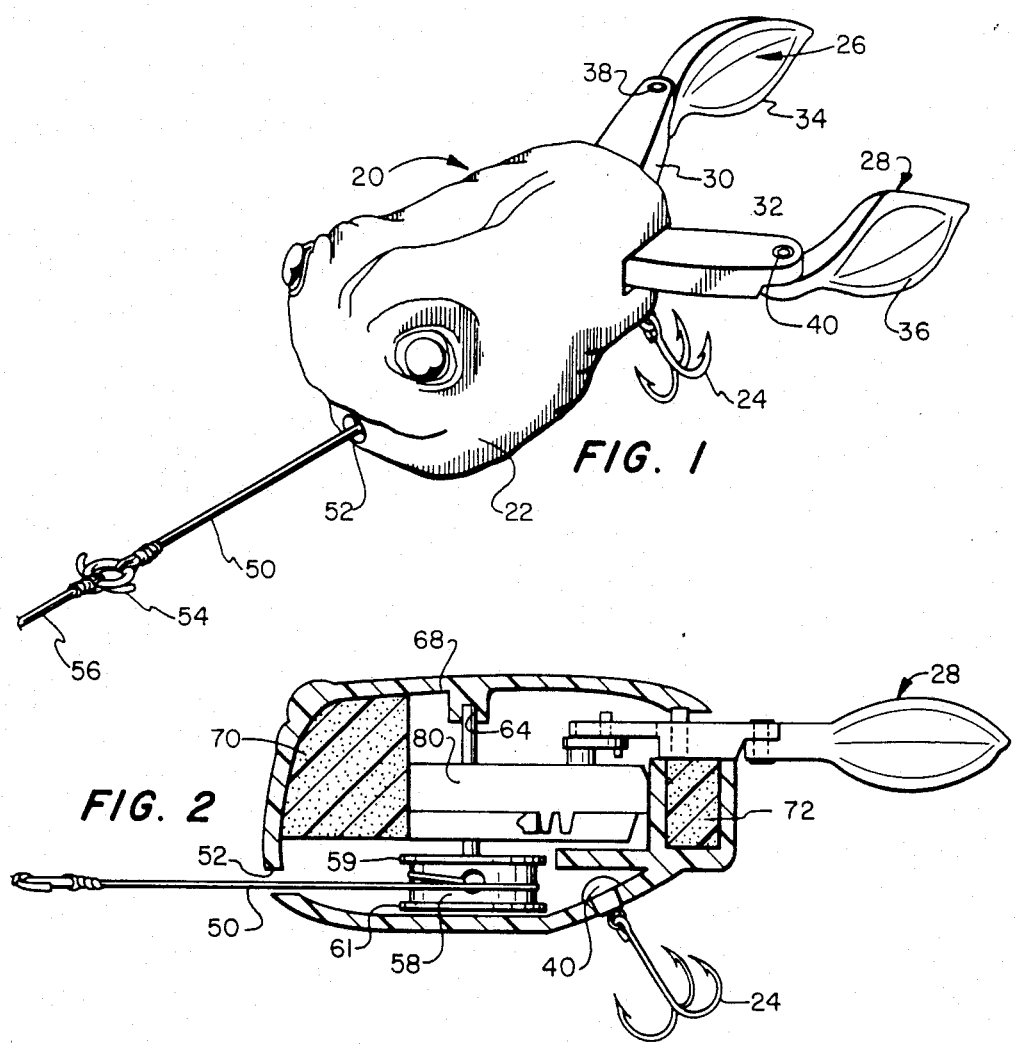
FIG. 1
FIG. 2
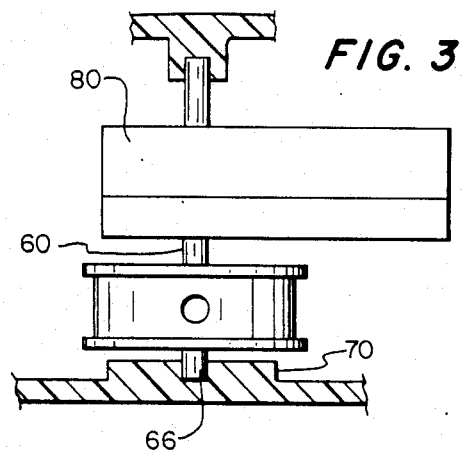
FIG. 3

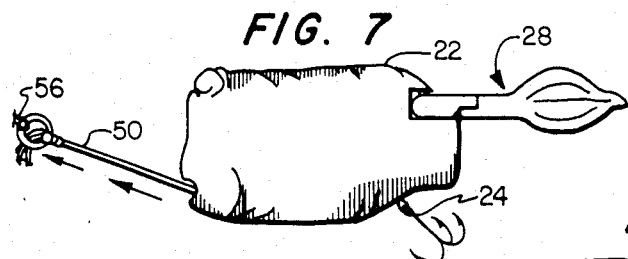
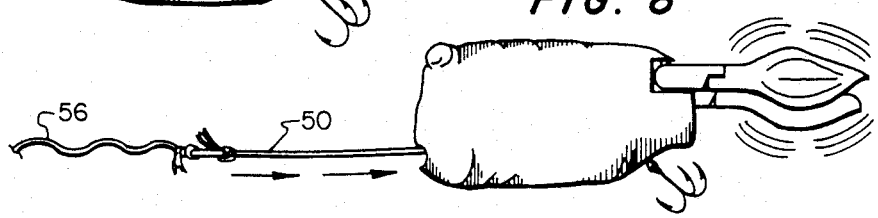
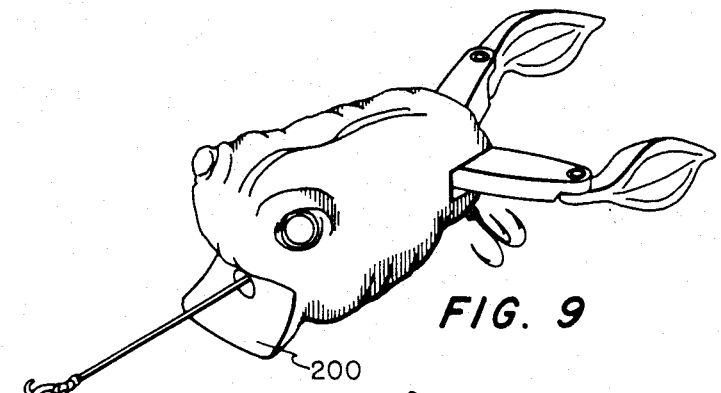
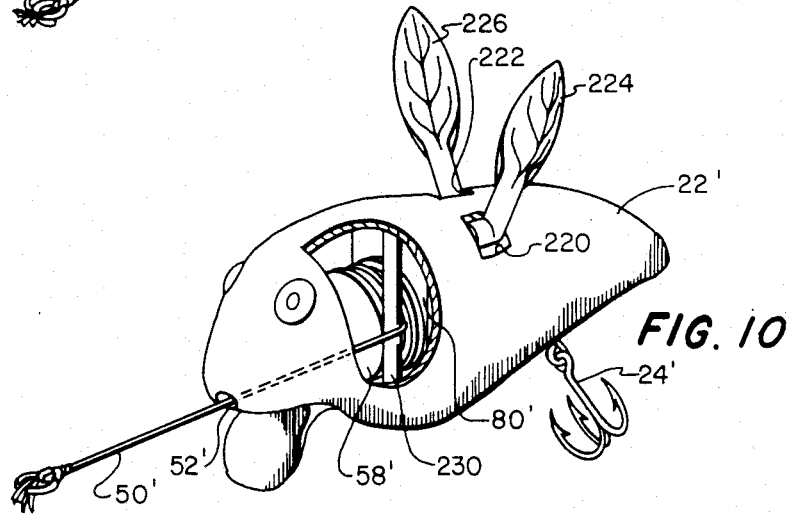

FISHING LURE

CROSS-REFERENCE TO RELATED APPLICATION

This application is a continuation-in-part application of application Ser. No. 595,392, filed Mar. 30, 1984, now abandoned.

TECHNICAL FIELD

The present invention relates to fishing lures and more particularly to a fishing lure having a line activated spring mechanism mounted within the body of the lure for driving lure body components projecting therefrom to provide for movement of the lure.

BACKGROUND ART

Mechanically propelled fishing lures have been proposed in several different embodiments in the past. Generally, these lures have been unreliable and overly complex in their structure. Prior attempts to produce a successful mechanically propelled lure have included attempts to store driving energy in elastic bands, such as in U.S. Pat. No. 2,183,365, to A. B. Cross. These structures have not provided reliability and have not produced a manner of operation of the lure which properly simulates the live action of fish or other bait. Attempts have also been made to simulate live action by using springs. Two such attempts are shown in U.S. Pat. No. 2,932,112, to E. G. Graves, Jr. and in U.S. Pat. No. 3,457,667 to A. M. Tripp. However, because of the manner of use of the springs in these, and other comparable references, accurate simulation and reliable operation has not been achieved.

Because of the unreliability of such mechanical devices, resulting in part from the direct loading of the spring mechanism and the effect of water impurities on these components, some attempt has been made to use electrically and chemically powered animated lures. In these arrangements, batteries must be stored in the body of the lure making the lure bulky and necessarily requiring repeated replacement and recharging of the battery as its power is consumed. The use of chemically activated devices also has been found to be unreliable, expensive and difficult to maintain in proper operation over extended periods of use.

Thus, a need has arisen for a reliable, yet relatively simple and easy to manufacture, mechanically driven lure which can be selectively and repeatedly activated by line action after casting the lure end which can withstand the high loading occasioned in gamefish angling.

DISCLOSURE OF THE INVENTION

With the limitations of these prior devices in mind, the present invention provides a mechanically, self-propelled fishing lure which overcomes many of the deficiencies recited above. In accordance with one embodiment of the invention, the fishing lure according to the present invention has a body structure with hooks attached thereto. A windup mechanism comprises a spool and a sealed enclosure incorporating a rust-proof spring, and gear train operating in conjunction with the spool to store energy therein. The fishing line is attached to and wound around the spool and the coil spring is tensioned by line-action, that is the angler's retrieve after casting of the lure.

Appropriate propulsion structures, such as a movable tail fin, movable legs or wings, extend externally from the body of the lure and are driven by the windup mechanism. A shaft extends through the windup mechanism and the spool and is secured in the lure body. An appropriate gear train is used to interconnect the windup mechanism to the propulsion structure such that oscillating movement is transmitted from the windup mechanism to the propulsion means.

Rotation of the spool winds the spring in the windup mechanism. A line is attached to the spool and extends therefrom out of the body structure. By pulling on the line, the spool is rotated to thereby wind the coil spring and store energy therein. Upon release of the line, the spool is rotated under the action of the uncoiling of the spring to draw in the line by winding the line around the spool. The rotation of the coil spring is transmitted by the gear train to provide an oscillating movement to the tail fin, legs or wings extending from the body of the lure.

In accordance with a further embodiment of the invention, the spool is positioned below the windup mechanism and the hooks are mounted to the body at substantially the same elevation as the spool.

In accordance with still another embodiment of the invention, the windup mechanism and spool are mounted with their axes of rotation substantially parallel to the longitudinal axis of the lure. In this embodiment, the line extends from the spool around a post mounted in the body of the lure and then out of the body substantially along the longitudinal axis thereof.

In accordance with still a further embodiment of the invention, the lure is designed such that the line exits the body portion to the rear of the lure. Thus, activation of the lure causes the lure to be propelled or "swim" away from the angler.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a perspective view of the lure of the present invention;

FIG. 2 is a vertical section view showing the internal structure of the lure;

FIG. 3 is an enlarged view of an alternative attachment for the windup mechanism and spool used in the present invention;

FIGS. 7 and 8 illustrates the operation of one embodiment of the present invention;

FIG. 9 is an alternative embodiment of the invention illustrated in FIG. 8 showing a lower lip portion for resisting forward movement of the lure;

FIG. 10 is a partially broken away prospective view of an alternative embodiment of the present invention wherein the windup mechanism and spool are mounted with their axes of rotation substantially aligned with the longitudinal axis of the lure;

DETAILED DESCRIPTION

Figure 4:
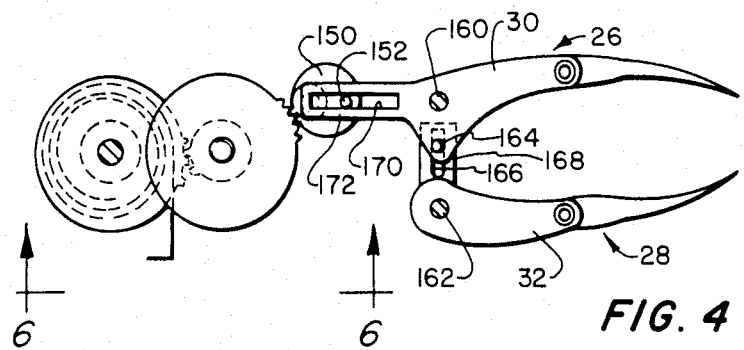
FIG. 4 is a plan view of the transmission structure of the present invention.

Referring to the spool drawings, and specifically FIGS. 1 and 2, the present invention is to an artificial game fish lure 20 having a main body portion 22 with one or more fishing hooks 24 attached thereto. In the embodiment illustrated in FIGS. 1 and 2, the lure body is a simulation of a frog and as the propulsion means, a pair of legs 26 and 28 extend from the rearward portion of body 22. Legs 26 and 28 include a main leg portion 30 and 32, respectively, with fin ends 34 and 36, respectively attached to the main portions by pins 38 and 40, respectively. Hook 24 is mounted to body 22 by an appropriate fastener 40, or its equivalent. A line 50 extends from the forward end of body 22 through an aperture 52 and has a ring 54 attached to its end for receiving a fishing line 56 as in the usual manner. Referring to FIG. 2, line 50 is attached to and engaged around a spool 58 mounted for rotation on a shaft 60. Spool 58 has an upper and lower lip 61 to facilitate retention of line 50 on the spool during winding and unwinding. Shaft 60 has its upper end mounted for rotation in receiving aperture 64 in boss 68.

In an alternative preferred embodiment shown in FIG. 3, the lower end of shaft 60 is also supported in body 22 by location in aperture 66 in boss 76. In this embodiment, the shaft 60 is then supported both above and below spool 58 to provide an improved arrangement for transfer of loading from line 50 to the body of the lure.

Figure 5:
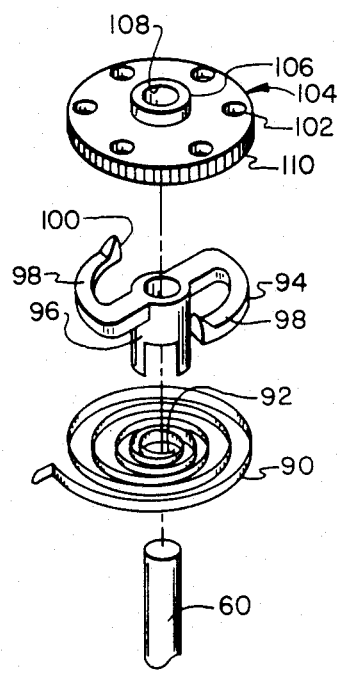
FIG. 5 is an exploded view of the windup mechanism of the present invention.
Figure 6:
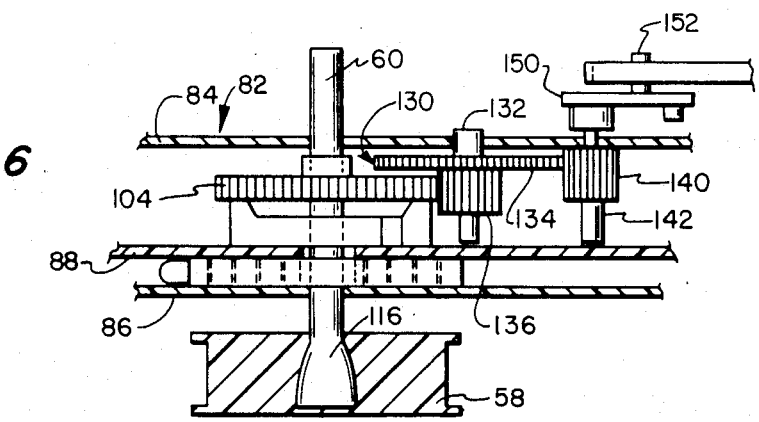
FIG. 6 is a section view of the transmission structure, windup mechanism and spool of the present invention.

Spool 58 is positioned below and shaft 60 extends through a windup mechanism 80. While the embodiment illustrated in FIG. 2 shows spool 58 positioned below windup mechanism 80, it will be appreciated that the spool may be positioned above the mechanism with the same advantages provided in the embodiment of FIG. 2. Windup mechanism 80 is best shown in FIGS. 4, 5, and 6. Referring to these figures, windup mechanism 80 includes an outer housing 82 having an upper wall 84, a lower wall 86 and an intermediate wall 88. A coil spring 90 is mounted between walls 86 and 88 with its inner end 92 engaged around shaft 60. A spider gear 94, having a hub 96 and spider arms 98 extending therefrom, is press mounted onto and rotates with shaft 60. Hub 96 extends through an aperture in wall 88 and engages end 92 of spring 90. Spider arms 98 of gear 94 are positioned above wall 88. Arms 98 include clutch teeth 100 at the end thereof for clutch engagement with a plurality of apertures 102 in gear 104 mounted above spider gear 94. Gear 104 includes a hub 106 having an aperture 108 therethrough for mounting the gear on shaft 60. Gear 104 also has a plurality of teeth 110 on the circumference thereof. As can be seen in FIG. 6, spool 58 is mounted below wall 86 and the lower end of shaft 60 is flared at 116 so that the spool may be securely attached thereto.

As can also be seen in FIG. 6, lower and upper walls 86 and 84 have apertures therethrough for receiving shaft 60. Because it has been found that the components of windup mechanism 80 will be affected by the natural impurities in lake water and other similar environments, the windup mechanism is sealed to prevent such impurities from coming into contact with the components of mechanism 80. Thus, the apertures in walls 84 and 86 are, in one embodiment, sized to such close tolerances as to fit closely to shaft 60. Further, the remainder of the case surrounding the windup mechanism is also sealed thereby preventing the entry of contaminants into the windup mechanism enclosure. It will of course be appreciated that as an alternative, the apertures in walls 84 and 86 may be enlarged to receive seals therein, such as of plastic or rubber, to provide an even closer contact to shaft 60. However, it is found that this is not necessary in most applications of the present invention. As a further alternative, the structure of the main body portion 22 may be designed to encase the windup mechanism and provide a water resistant seal around the mechanism.

As can be seen in FIG. 2, a gear train structure 120 connects windup mechanism 80 to legs 26 and 28. This gear train structure is best shown in FIGS. 4 and 6. Referring first to FIG. 6, this structure includes a dual gear 130 having a shaft 132 for engagement through walls 84 and 86 for rotation relative thereto. Gear 130 includes a larger upper gear segment 134 and a smaller lower segment 136. As can be seen in both FIGS. 4 and 6, lower gear segment 136 meshes with gear 104. A third gear 140 has a shaft 142 for engagement through upper wall 84 and intermediate wall 88 for a rotation relative thereto. Gear 140 is mounted such that it is in meshing engagement with the upper gear segment 134 of gear 130. A disk 150 is mounted to the upper end of shaft 142 and has a pin 152 extending upwardly from disk 150 at a predetermined distance from the axis of rotation about shaft 142.

Referring now to FIG. 4 in conjuction with FIGS. 2 and 6, leg segments 30 and 32 are pinned to body 22 by pins 160 and 162, respectively. Leg portion 30 has a pin 164 which engages a slot 166 in a extension 168 from leg portion 32 such that rotation of leg portion 30 about pin 160 results in the rotation of leg portion 32 about pin 162. Pin 152 of disk 150 moves in a slot 170 in an extension 172 of leg portion 30. Thus, by rotation of disk 150, the movement of pin 152 in rotation about the axis of shaft 142 results in the oscillation of leg portion 130 and a corresponding oscillation or pivoting of leg portion 32.

Rotation of disk 150 is accomplished by the rotation of shaft 60. This is accomplished by winding spool 58 and shaft 60 to first coil spring 90 and then the release of spool 58 to permit spring 90 to uncoil. As can be appreciated, the clutch action of spider gear 94 will permit the winding of spring 90 without the rotation of gear 104. This is the result of the indexing of spider gear 94 relative to gear 104 by flexing of spider arms 98 and the indexing of clutch teeth 100 relative to apertures 102 and 104. This indexing movement produces a "clicking" sound which adds to the effectiveness of the lure from the standpoint of attracting fish or other game. Upon the release of spool 58, and the unwinding of spring 90, clutch teeth 100 of spider gear 94 will engage apertures 102 of gear 110 to rotate gear 130 and in turn gear 140 to drive disk 150 and oscillate legs 26 and 28 of the lure. The unwinding of springs 90 also rotates shaft 60 to rotate spool 58 and automatically wind in line 50 attached thereto. Thus, the present invention provides for the automatic rewinding of line 50.

Referring again to FIG. 2, the fishing lure includes a forward cavity 170 having a sealed space or buoyant material, such as styrofoam or the like, therein. The body also includes a rear cavity 72 also sealed or filled with a buoyant material, such as styrofoam. These materials and the overall design of the lure provide the lure with a floating position such as shown in FIGS. 7 and 8, although underwater line application is also available.

Operation of the lure is best understood by reference to FIGS. 7 and 8. The lure is activated by the angler's retrieve by using a popping or chugging rod tip pull to apply a tension to line 50. It will be appreciated that line 50 is initially wound around spool 58 and by applying a tension to line 50, the spool is unwound to rotate spider gear 94 (which is pressed onto shaft 50). As soon as tension is released on line 50, spring 90 begins to uncoil thereby rotating gear 104 and the gear train structure described hereinabove to oscillate legs 26 and 28. The oscillation of the legs causes lure 20 to swim and move in the water as though it is a live bait. This action can be repeated as many times as it is desirable to cause the lure to swim through the water toward the fisherman. During operation of the windup mechanism and the gear train, an audible "clicking" sound is produced as spider gear 94 is indexed relative to gear 104 by virtue of pulling on line 50 and rotating spool 58 and shaft 60. Further, a different, but still audible, buzz sound is produced upon release of tension on line 50 as the spring unwinds and expands. This sound is also a result of the quick movement of the gear train components and moving body parts. Thus, the present invention provides a device which not only can be line actuated to produce movement of body parts of the lure, but also produces two different sounds, one upon winding and one upon unwinding, which further attracts fish and other game. This audible sound greatly adds to the success of the lure.

This action is improved by incorporating the modification showed in FIG. 9. A lip or concave face 200 is mounted at the forward end of lure body 22 to provide resistance to the movement of the lure through the water such that sufficient tension can be applied to the lure to wind the spring mechanism without movement of the lure in water to any appreciable extent.

FIG. 10 illustrates a further embodiment of the present invention. In this embodiment, the spool, spring mechanism, transmission structure and propulsion structure are mounted such that the rotation of the spool and spring mechanism is about an axis substantially aligned or parallel with the longitudinal axis of the lure. As a result, the movement of the externally extending appendages are also about axes substantially parallel to the longitudinal axis of the lure. This provides for a flapping action which simulates wing movement, rather than leg or fin movement. This movement has been found to be extremely successful in attracting fish and thus provides a lure which is highly successful.

This embodiment incorporates some of the same components as those described in the embodiment of FIGS. 1 through 8. These similar structures will be referred to using the same numerals as in the first embodiment but with the addition of a prime (') designation. Referring to to FIG. 10, the lure includes a lure body 22' with a hook 24' attached thereto. A spool 58' and the associated spring mechanism 80' and transmission structure, as described in the earlier embodiment, are arranged such that the axis of rotation is substantially aligned with or is parallel to the longitudinal axis of the lure body 22'. As can be seen in FIG. 10, body 22' has a pair of openings 220 and 222 through which appendages 224 and 226 extend. These appendages 224 and 226 are comparable to leg segments 30 and 32 described with respect to the embodiment of FIGS. 1 through 8. However, they extend substantially upwardly from body 22' and their oscillation results in a simulation of wings rather than the movement of legs or fins.

To accomplish the rotation of spool 58', a post 230 is mounted in body 22' to one side of spool 58'. Line 50' is directed from spool 58' around post 230 and exits through forward aperture 52'. Thus, the present embodiment provides a lure which provides for wing movement but incorporating a very compact arrangement of spool, spring mechanism and gear train such that the lure can be made compact and of the sizes popularly accepted by fishermen.

Figure 11:
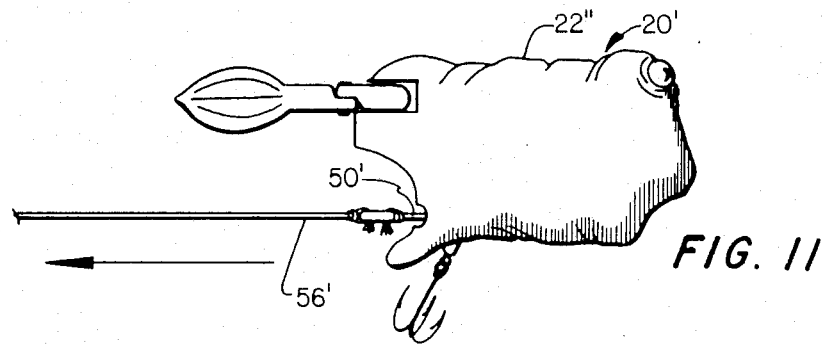
FIG. 11 is an alternative embodiment of the present invention.

FIGS. 11 shows a further embodiment of the present invention incorporating many features similar to or analogous to those described with respect to the embodiment illustrated in FIGS. 1 through 8. Thus, to avoid duplication of description, these comparable or analogous structures will be referred to using the same numbers as used to described the embodiment of FIGS. 1 through 8 but the addition of a double prime (") designation. The embodiment of FIG. 11 permits the activation of legs 26" of a lure 20" such that the lure will swim away from the angler upon activation. In this embodiment, line 50" extends from the rear of the lure through an aperture 250. Thus, in this embodiment, the fisherman may pull in the lure during activation and the lure will swim away from the fisherman.

As can be appreciated from the above description and discussion, the present invention allows live bait action in an artificial lure in a manner currently unavailable in existing lures. The present lure is selfwinding by the line action. This is accomplished by a highly reliable activation mechanism which is compact and permits the design of popular ¼ or ½ ounce lure sizes, and can be filled to any size fishing lure including saltwater models. Further, the structure incorporates an optimum positioning of the line and its attachment to a spool mounted below. In one embodiment, the spring mechanism dispositions the line substantially in alignment with the hooks, mounted on the lower portion of the lure. Further, the spool on which the line is wound and to which it is attached, is supported on a shaft which is journaled at both the upper and lower end to the body of the lure. Thus, upon catching a fish, loading through the line passes directly from the spool to the body of the lure and such that none of the load is taken in the spring mechanism. Thus, the loading occasioned by catching a fish is not felt at all by the spring mechanism. This action is accomplished by a purely mechanical structure without the attendant problem which occasions the use of batteries or chemicals.

The particular structure of the windup mechanism, gear train and moving body parts also produces an audible sounds during operation. These sounds, resulting from the expansion of the spring and rapid movement of the moving parts and from the indexing of the gear train components, add greatly to the overall effectiveness of the lure.

A further embodiment of the present invention provides a direct application of the structure of the primary embodiment such that the movement of the lure may be accomplished while maintaining the pull of the lure from either the forward or rear of the lure itself.

Figure 12:
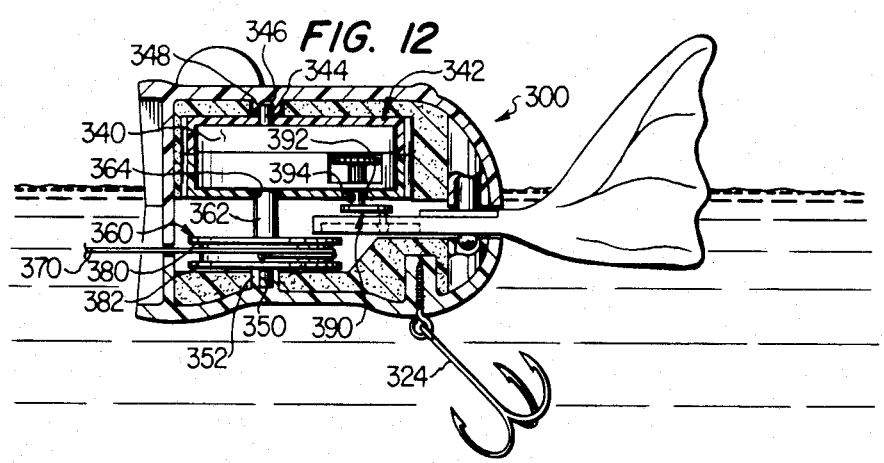
FIG. 12 is a vertical section view of an alternative embodiment of the present invention showing the internal structure of the lure.
Figure 13:
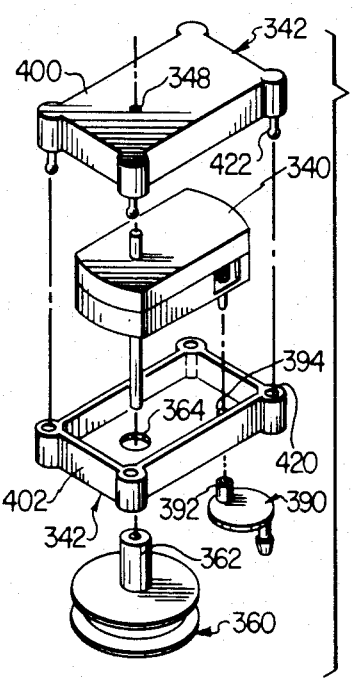
FIG. 13 is an exploded view showing the windup mechanism and associated structure used in the alternative embodiment of FIG. 12.
Figure 14:
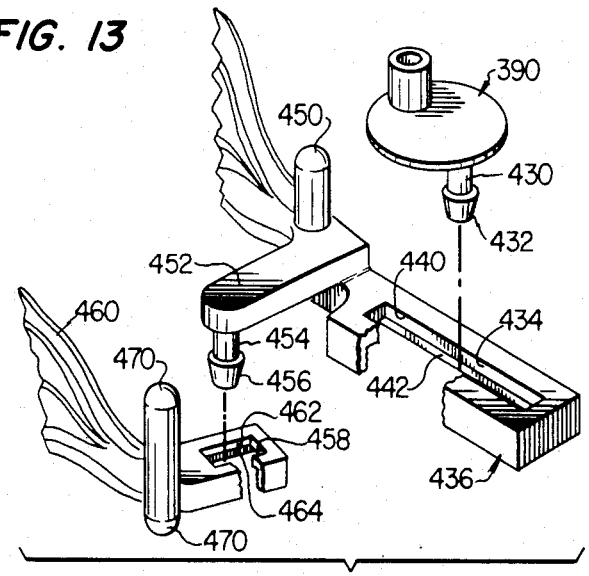
FIG. 14 is an exploded view showing the connecting structure between the movable legs and drive mechanism for the alternative embodiment of FIG. 12.

FIGS. 12 through 14 illustrate an alternative embodiment of the present invention wherein the lure is designed to further isolate the windup mechanism from contaminants in the water in which the lure is used. The alternative embodiment also includes a alternative design for the attachment of the drive mechanism to the oscillating legs and attachment between the legs.

Referring specifically to FIG. 12, an alternative lure 300 is shown in section view having a main body portion 322 with one or more fishing hooks 324 attached thereto. Main body portion 322 houses a windup mechanism 340 having a water tight enclosure 342 therearound and a shaft 344 extending above and below the mechanism. The upper end of shaft 344 is journaled in an aperture 346 in boss 348 and the lower end of shaft 344 is journaled in an aperture 350 in boss 352. Bosses 348 and 352 are integrally formed in main body portion 322 for transmitting loads between the shaft and the body portion.

A spool 360 is received on the lower end of shaft 344 and has a sleeve 362 which extends through an aperture 364 in enclosure 342 for positioning adjacent to windup mechanism 340. As with the previously described embodiment, spool 366 receives a line 370 thereon with its end attached to spool 360 for winding therearound. Spool 360 has upper and lower lips 380 and 382, respectfully, to define an area between which line 370 may be wound.

Windup mechanism 340 is similar in structure and operation to that illustrated and described with respect to the prior embodiments with the exception that a drive disk 390 is mounted from a shaft extended from below mechanism 340 rather than above, as shown and described with respect to the previous embodiment illustrated in FIG. 6. With the exception of this change, windup mechanism 340 is substantially the same as that previously dscribed and thus will not be described here in detail. Disk 390 has a shaft sleeve 392 which extends though an aperture 394 in enclosure 342 for abutment adjacent to mechanism 340.

The mounting of watertight enclosure 342 adjacent windup mechanism 340 is best shown in FIG. 13. Enclosure 342 includes upper and lower sections 400 and 402, section 400 including aperture 346 for receiving shaft 344 therethrough and lower section 402 including apertures 364 and 394 for receiving sleeves 362 and 392 of spool 360 and drive disk 390, respectfully.

Lower section 402 of enclosure 342 has a plurality of receiving apertures 420 for receiving male ends 422 for interlocking the enclosure segments together over windup mechanism 340. While this means of attachment is disclosed, it will be appreciated by those skilled in the art that other equivalent means of attachment could be incorporated. For example, cement or various latching mechanisms could be substituted. It will further be understood that the apertures 346, 364 and 394 will be sized to provide a close, but not friction fit, between the components passing therethrough, the objective being to isolate the windup mechanism from debris and other contaminants while not interferring with the movement of the components during operating the lure.

Referring now to FIG. 12 in conjunction with FIG. 14, drive disk 390 includes a pin 430 extending therefrom with a tapered tip 432 on the end thereof. The tapered tip 432 is sized for snapping engagement through an elongated slot 434 in extension 436 from leg 438. Slot 434 has a upper opening 440 having a width slightly smaller than the uppermost diameter of tapered tip 432 and a lower opening 442 which is wider than the upper diameter portion of tapered tip 432. The heighth dimension of pin 430 is slightly greater than the heighth dimension of slot 440. Leg 438 is pivotally received within appropriate apertured bosses in body portion 322 for pivotal movement relative to the body of the lure. Leg 438 includes an upper and lower pin 450 for receipt within these appropriate aperture bosses.

Leg 438 further includes a connecting arm 452 which has a pin 450 for extending therefrom with a tapered tip 456 at the end thereof. Tapered tip 456 snaps into and cooperates with an aperture 458 within leg 460. Aperture 458 is similar in design to that of slot 434, including an upper portion 462 having a width slightly smaller than the uppermost diameter of tapered tip 456, but not so much smaller that as to prevent snapping engagement of tip 456 therethrough. Aperture 458 includes a lower portion 464 having a somewhat larger width than the uppermost diameter of tapered tip 456. Leg 460 is pivotally received within apertured bosses and main body portion 322 to permit pivotal movement. Leg 460 includes pins 470 for engagement within such apertured bosses.

As can seen in FIG. 12, extension 436 of leg 438 is maintained in its appropriate position by being located below drive disk 390 and above spool 360. In this way, dislocation of extension 436 is prevented by the entrapment of the positioning of the extension between the drive disk and spool. Of course, disengagement is also prevented by the snap engagement of tapered tips 432 and 456, on the distal ends of pins 430 and 454, and engaging the respective slots in which they operate.

Referring again to FIG. 12, body portion 322 is fitted with floatable insert material, such as styrofoam, and the windup mechanism is positioned relatively high within the overall body design. In the primary embodiment, the lure is designed such that it will float at a position such that the windup mechanism is completely or substantially above the waterline of the lure in its floating position.

The embodiment of FIGS. 12 through 14 provides a significant advancement by positioning the windup mechanism high in the lure configuration and thus with the floatable material positioned therein above or substantially above the water line. Further, the design incorporates a substantially fluid tight enclosure around the windup mechanism to prevent contamination of the mechanism with debris, sand, dirt, or any other material which could interfere with the continuous operation of the unit.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A fishing lure for use in water having a body with hooks attached thereto comprising:
   a windup mechanism comprising a spring mechanism, a spool operated in conjunction with said spring mechanism to store energy therein, propulsion means driven by said windup mechanism extending externally of said body for movement upon operation of said windup mechanism, shaft means extending through said spool and rotatively secured to said body, drive train means driven by said spring mechanism to drive said propulsion means, said drive train means providing movement to said propulsion means, first housing means for supporting said spring mechanism therein, and seal housing means other than said body for substantially completely enclosing said first housing means to prevent contaminants which enter said body from contacting said spring mechanism.

2. The lure according to claim 1 further comprising ballast means for floating said lure such that said windup mechanism is normally substantially above the water line of the lure as it floats in the water.

3. The lure according to claim 1 wherein said spool is positioned below said spring mechanism and said hooks are mounted to said body at substantially the same elevation as said spool.

4. The lure according to claim 1 wherein rotation of said spool winds said windup mechanism and fully comprising a line attached to said spool and extending therefrom out of the body structure whereby pulling said line rotates said spool to thereby wind said spring.

5. The lure according to claim 3 wherein said shaft means passes through said spring housing means and wherein the tolerances between said shaft means and housing means are such as to prevent contaminants from entering said housing means.

6. The lure accordinq to claim 1 wherein said axis of rotation of the spool and windup mechanism is substantially parallel to the longitudinal axis of the lure.

7. The lure according to claim 1 wherein the winding of said windup mechanism produces an audible sound during operation.

8. The lure according to claim 1 wherein the winding of said windup mechanism produces an audible clicking sound during operation.

9. The lure according to claim 1 wherein said shaft means comprises a shaft extending through said spool and spring which is journaled above and below said spool and spring in the body structure of the lure.

10. A fishing lure for use in water having a lure body with hooks attached hereto comprising:

a windup mechanism comprising a spool and a spring operated in conjunction with said spool to store energy therein, propulsion means driven by said windup mechanism extending externally of the lure body for movement upon operation of said windup mechanism, a shaft extending through said spool and spring mechanism and journaled on both sides thereof in the lure body, first housing means for supporting said spring mechanism therein, and seal housing means other than the lure body for substantially completely enclosing said first housing means to prevent contaminants entering the lure body from contacting said spring mechanism.

11. The lure according to claim 10 wherein rotation of said spool winds said windup mechanism and further comprising a line attached to said spool and extending therefrom out of the body structure whereby pulling said line rotates said spool to thereby wind said spring.

12. The lure according to claim 10 wherein said axis of rotation of the spool and windup mechanism is substantially parallel to the longitudinal axis of the lure.

13. The lure according to claim 10 wherein the winding and unwinding of said windup mechanism produces audible sounds upon operation of said windup mechanism.

14. The lure according to claim 13 wherein the sound produced by the winding of said windup mechanism is distinct from the sound produced by the unwinding.

15. The lure according to claim 10 wherein said shaft means passes through said spring housing means and wherein the tolerances between said shaft means and housing means are such as to prevent contaminants from entering said housing means.

16. A fishing lure having a body with hooks attached thereto comprising:

a windup mechanism comprising a spool, said axis of rotation of said spool being substantially parallel to the longitudinal axis of the lure, propulsion means driven by said windup mechanism extending externally of said body for movement upon operation of said windup mechanism, said propulsion means extending substantially upwardly from said body, drive train means driven by said windup mechanism to drive said propulsion means, said drive train means providing oscillating movement to said propulsion means, said propulsion means comprising one or more wing members driven by said drive train means to oscillate about an axis substantially parallel to the longitudinal axis of the lure.

17. A fishing lure for use in a body of water hving a body structure with hooks attached thereto comprising:

a windup mechanism comprising a spool and a spring mechanism operated in conjunction with said spool to store energy therein, propulsion means driven by said windup mechanism extending externally of said body for movement upon operation of said windup mechanism, shaft means extending through said spool and rotatively secured at one end to said body, drive train means driven by said spring to drive said propulsion means, siad drive train means providing oscillating movement to said propulsion means, housing means for substantially completely enclosing said spring mechanism to prevent contaminants from contacting said spring mechanism, and ballast means for floating said lure such that said spring mechanism is normally substantially above the water line of the lure as it floats in the water.

18. A fishing lure for use in a body of water having a body structure with hooks attached thereto comprising:

a windup mechanism comprising a spool and a spring mechanism operated in conjunction with said spool to store energy therein, said spring mechanism being positioned in the body such that it is normally substantially above the water line of the lure as it floats in the water, propulsion means driven by said windup mechanism extending externally of said body for movement upon operation of said windup mechanism, shaft means extending through said spool and rotatively secured at one end to said body, drive train means driven by said spring to drive said propulsion means, said drive train means providing oscillating movement to said propulsion means, and housing means for substantially completely enclosing said spring mechanism to prevent contaminants from contacting said spring mechanism.

19. A fishing lure for use in a body of water having a body structure with hooks attached thereto comprising:

a windup mechanism comprising a spool and a spring operated in conjunction with said spool to store energy therein, propulsion means driven by said windup mechanism extending externally of said body for movement upon operation of said windup mechanism, a shaft extending through said spool and spring mechanism and journaled on both sides thereof in the body structure of the lure, said hooks being mounted on said body structure at substantially the same elevation as said spool, and ballast means for floating said lure such that said spring mechanism is normally substantially above the water line of the lure as it floats in the water.

20. A fishing lure for use in a body of water having a body structure with hooks attached thereto comprising:

a windup mechanism comprising a spool and a spring operated in conjunction with said spool to store energy therein, said spring being positioned in the body structure such that it is normally substantially above the water line of the lure as it floats in the water, propulsion means driven by said windup mechanism extending externally of the body structure for movement upon operation of said windup mechanism, and a shaft extending through said spool and spring mechanism and journaled on both sides thereof in the body structure of the lure, said hooks being mounted on said body structure at substantially the same elevation as said spool.

21. A fishing lure for use in a body of water have a lure body with hooks attached thereto comprising:

a windup mechanism housed within the lure body, a line connected to said windup mechanism and extending from the lure body, said windup mechanism being operable by engagement of said line, propulsion means extending externally of said body for movement upon operation of said windup mechanism, drive train means driven by said windup mechanism to drive said propulsion means, said drive train means providing movement to said propulsion means, and ballast means for floating said lure such that said windup mechanism is normally substantially above the water line of the lure as it floats in the water.

22. A fishing lure for use in a body of water having a lure body with hooks attached hereto comprising:

an energy storage mechanism, said energy storage mechanism being positioned in the lure body such that it is normally substantially above the water line of the lure as it floats in the water, a line connected to said energy storage mechanism and extending form the lure body, said energy storage mechanism being operable by engagement of said line, propulsion means extending externally of said lure body for movement upon operation of said energy storage mechanism, and drive train means driven by said energy storage mechanism to drive said propulsion means, said drive train means providing movement to said propulsion means.

23. A fishing lure for use in a body of water having a body structure with hooks attached thereto comprising:

a windup mechanism comprising an energy storage component mounted within the lure body structure, a line connected to said windup mechanism and extending from the lure body structure, said windup mechanism being operable by engagement of said line, propulsion means driven by said windup mechanism extending externally of said body for movement upon operation of said windup mechanism, and ballast means for floating said lure such that the energy storage component of said windup mechanism is normally substantially above the water line of the lure as it floats in the water.

* * * * *

UNITED STATES PATENT AND TRADEMARK OFFICE
CERTIFICATE OF CORRECTION

PATENT NO. : 4,674,223

DATED : June 23, 1987

INVENTOR(S) : Frank G. Pearce

It is certified that error appears in the above-identified patent and that said Letters Patent is hereby corrected as shown below:

Column 2, line 62, "prospective," should be --perspective--.

Column 5, line 2, "forward cavity 170," should be --forward cavity 70--.

Column 5, line 39, "showed," should be --shown--.

Column 5, line 63, "Referring to to FIG. 10," should be --Referring to FIG. 10--.

Column 6, line 19, "FIGS. 11," should be --FIG. 11--.

Column 6, line 26, "described," should be --describe--.

Column 6, line 60, "produces an," should be --produces--.

Column 7, line 7, "a alternative," should be --an alternative--.

Column 7, line 63, "during operating the lure," should be --during operation of the lure--.

Column 8, line 4, "heighth," should be --height--.

Column 8, line 5, "heighth," should be --height--.

Column 9, lines 26-27, "fully comprising," should be --further comprising--.

Column 9, line 50, "attached hereto," should be --attached thereto--.

UNITED STATES PATENT AND TRADEMARK OFFICE
CERTIFICATE OF CORRECTION

PATENT NO. : 4,674,223    Page 2 of 2
DATED : June 23, 1987
INVENTOR(S) : Frank G. Pearce It is certified that error appears in the above-identified patent and that said Letters Patent is hereby corrected as shown below:

Column 10, line 37, "hving," should be --having--.

Column 10, line 48, "siad," should be --said--.

Column 11, line 45, "have a," should be --having a--.

Column 12, line 15, "attached hereto," should be --attached thereto--.

Column 12, line 21, "form," should be --from--.

Signed and Sealed this

Fourth Day of October, 1988

Attest:

DONALD J. QUIGG

Attesting Officer    Commissioner of Patents and Trademarks